United States Patent
Wan

(10) Patent No.: US 10,520,652 B2
(45) Date of Patent: Dec. 31, 2019

(54) LENS MODULE

(71) Applicant: Jia Wan, Shenzhen (CN)

(72) Inventor: Jia Wan, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 193 days.

(21) Appl. No.: 15/677,068

(22) Filed: Aug. 15, 2017

(65) Prior Publication Data

US 2018/0299590 A1 Oct. 18, 2018

(30) Foreign Application Priority Data

Apr. 15, 2017 (CN) .................... 2017 2 0398233 U

(51) Int. Cl.
G02B 5/00 (2006.01)
G02B 7/02 (2006.01)
G02B 5/20 (2006.01)
G02B 7/00 (2006.01)
G02B 13/00 (2006.01)

(52) U.S. Cl.
CPC ............ *G02B 5/003* (2013.01); *G02B 5/005* (2013.01); *G02B 7/02* (2013.01); *G02B 5/208* (2013.01); *G02B 7/006* (2013.01); *G02B 13/004* (2013.01)

(58) Field of Classification Search
CPC .... G02B 1/10–19; G02B 5/003; G02B 5/005; G02B 7/022; G02B 13/004; G02B 5/208; G02B 7/02; G02B 7/006
See application file for complete search history.

(56) References Cited

U.S. PATENT DOCUMENTS

| | | | | |
|---|---|---|---|---|
| 8,090,250 B2* | 1/2012 | Lusinchi | ............... | G03B 3/00 396/439 |
| 2004/0095502 A1* | 5/2004 | Losehand | ............... | H01L 24/97 348/340 |
| 2010/0039713 A1* | 2/2010 | Lusinchi | ............... | G02B 13/001 359/819 |
| 2010/0244165 A1* | 9/2010 | Lake | ............... | G02B 3/0056 257/432 |
| 2010/0322610 A1* | 12/2010 | Lusinchi | ............... | G03B 3/00 396/89 |
| 2011/0019282 A1* | 1/2011 | Lusinchi | ............... | G02B 13/001 359/619 |
| 2011/0052180 A1* | 3/2011 | Pei | ............... | G02B 5/003 396/439 |
| 2016/0178805 A1* | 6/2016 | Kang | ............... | G02B 7/021 359/614 |
| 2016/0349504 A1* | 12/2016 | Kim | ............... | G02B 27/0018 |

* cited by examiner

Primary Examiner — William R Alexander
(74) Attorney, Agent, or Firm — IPro, PLLC; Na Xu

(57) ABSTRACT

The present disclosure provides a lens module. The lens module includes a lens barrel with an accommodation space; a lens group accommodated in the accommodation space; a filter, a bracket and a sensor set by an image side of the lens group and outside the accommodation space. The bracket includes a top wall forming an optical aperture and a side wall extending from the top wall to the image side. The top wall has a first surface facing towards an object side, a second surface arranged opposite to the first surface and a third surface connecting the first surface to the second surface and enclosing the optical aperture. The bracket further includes a first hollow cavity arranged near the third surface, and the first hollow cavity is filled with a black light absorption substance.

8 Claims, 2 Drawing Sheets

LENS MODULE

FIELD OF THE PRESENT DISCLOSURE

The present disclosure relates to a lens module used in a portable or mobile electronic equipment.

DESCRIPTION OF RELATED ART

With a rapid development of a multimedia technology, a digital camera, a camera and a cell phone with a webcam are more and more popular among extensive consumers, and a production to the digital camera, camera and cell phone is increasing gradually, and a requirement to the product cost and product quality is also increasing gradually, however, a bracket for a lens module is one of key components that impacts the product quality and production cost.

In the relevant technology, a bracket of a lens module has an inclined surface facing towards a sensor, and a light from a filter is reflected by this inclined surface, and a stray light reaches the sensor, and generates a section of purple flash or flare, which seriously impacts an imaging quality of the lens module.

Therefore it is necessary to provide an improved lens module for overcoming the above-mentioned disadvantages.

BRIEF DESCRIPTION OF THE DRAWING

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
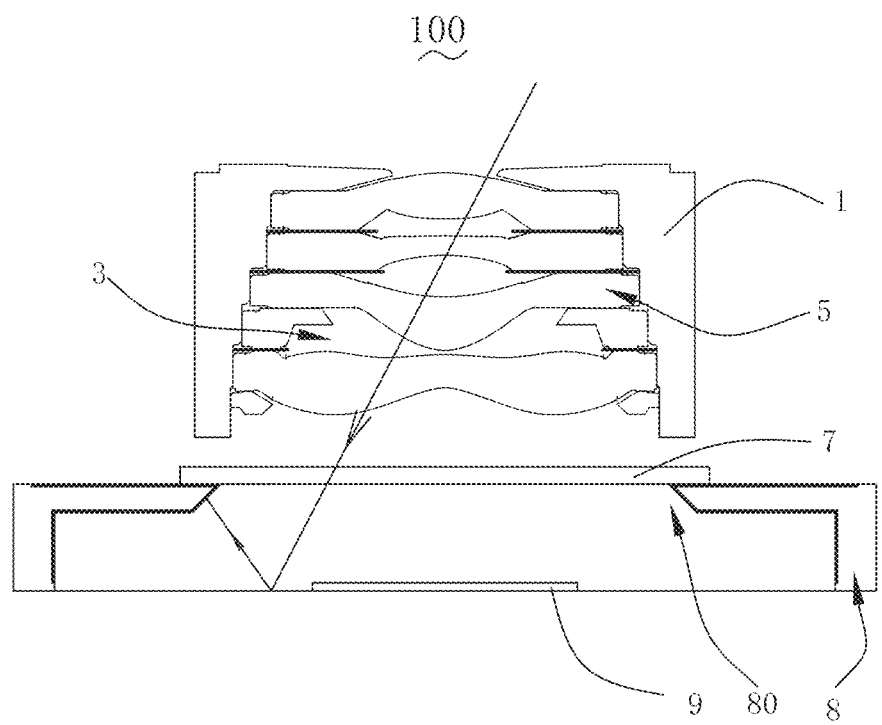
FIG. 1 is an illustrative cross-sectional view of a lens module in accordance with an exemplary embodiment of the present disclosure.
Figure 2:
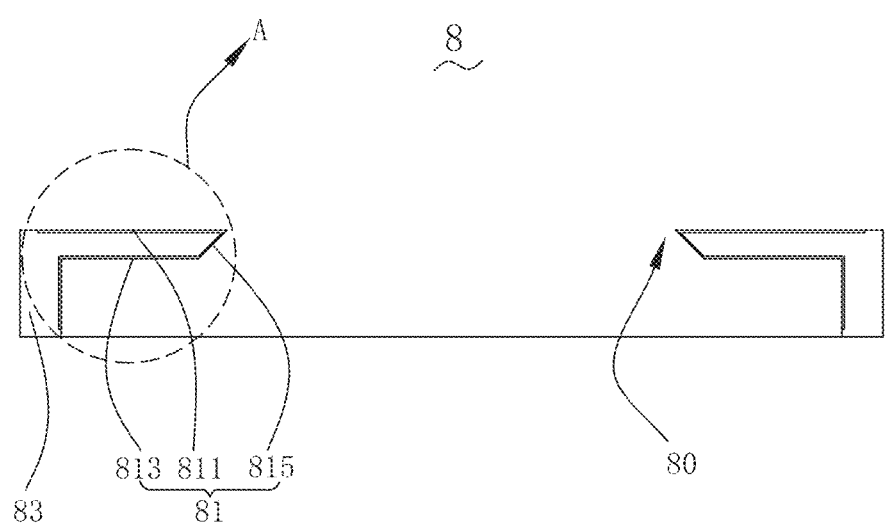
FIG. 2 is an illustration of a bracket not filled with a black light absorption substance.
Figure 3:
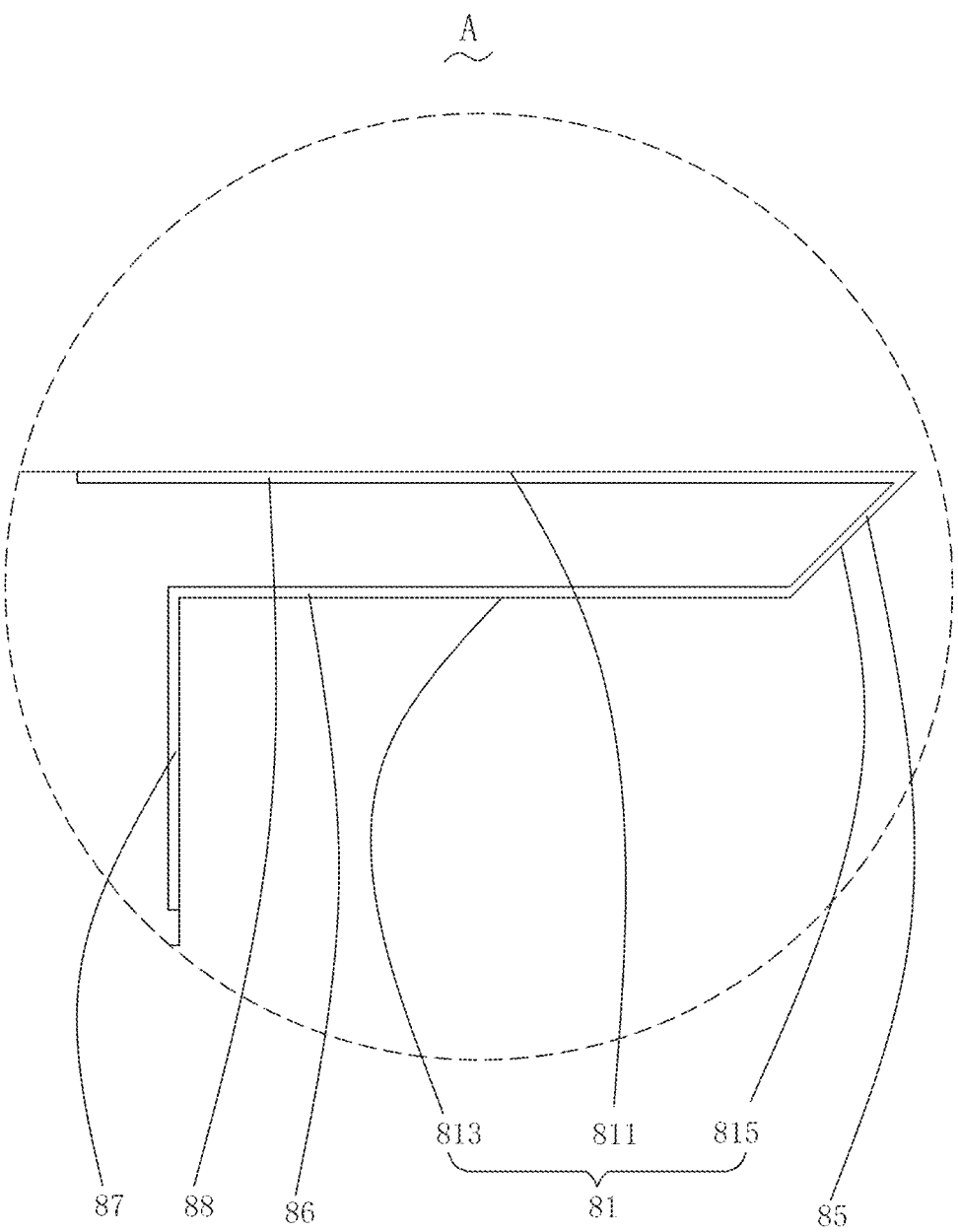
FIG. 3 is an enlarged view of Part A in FIG. 2.

Referring to FIGS. 1-3, a lens module 100 in accordance with an exemplary embodiment of the present disclosure comprises a lens barrel 1, a lens group 5, a filter 7, a bracket 8 and a sensor 9. The lens barrel 1 has an accommodation space 3 for accommodating the lens group 5. The filter 7, the bracket 8 and the sensor 9 are set by an image side of the lens group 5 and outside the accommodation space 3.

In this embodiment, the filter 7 is an infrared filter, and the bracket 8 is a VCM (voice coil motor) bracket.

The bracket 8 comprises a top wall 81 facing an object side and a side wall 83 facing an image side extending from the top wall 81, and the top wall 81 comprises a first surface 811 facing towards the object side, a second surface 813 arranged opposite to the first surface 811 and a third surface 815 connecting to the first surface 811 and the second surface 813 and the third surface 815 encloses an optical aperture 80.

In this embodiment, the third surface 815 is an inclined surface, and the filter 7 is arranged between the lens barrel 1 and the bracket 8 for being supported on the first surface 811. The sensor 9 is arranged inside the bracket 8.

The bracket 8 further comprises a first hollow cavity 85 arranged near the third surface 815 formed in the bracket 8, and the first hollow cavity 85 is filled with a black light absorption substance.

Alternatively, the bracket 8 further comprises a second hollow cavity 86 arranged near the second surface formed 813 in the bracket 8, and the second hollow cavity 86 communicates with the first hollow cavity 85, and both the first hollow cavity 85 and the second hollow cavity 86 are filled with a black light absorption substance.

In other embodiment, the bracket 8 further comprises a third hollow cavity 87 arranged near an inner surface of the side wall 83 formed in the bracket 8, and the third hollow cavity 87, the second hollow cavity 86 and the first hollow cavity 85 communicated with each other. The first hollow cavity 85, the second hollow cavity 86 and the third hollow cavity 87 are filled with a black light absorption substance.

Optionally, the bracket 8 further comprises a fourth hollow cavity 88 arranged near the first surface 811 formed in the bracket 8, and the fourth hollow cavity 88, the third hollow cavity 87, the second hollow cavity 86 and the first hollow cavity 85 communicate with each other. The first hollow cavity 85, the second hollow cavity 86, the third hollow cavity 87 and the fourth hollow cavity 88 are filled with a black light absorption substance. The third hollow cavity 87 is configured with a through hole connecting outside, and the black light absorption substance is filled into the third hollow cavity 87, the second hollow cavity 86, the first hollow cavity 85 and the fourth hollow cavity 88 in turn from the through hole, and the through hole is sealed by a hole plug.

The black light absorption substance is preferably a graphene.

Compared with other technologies, a lens module provided by the present disclosure has a plurality of advantags as follows:

Arranging a hollow cavity inside a bracket and filling a black light absorption substance in the hollow cavity can largely absorb a light hit on the bracket, and weaken a light energy, and avoid generating a stray light reaching a sensor, in order to improve an imaging quality of the lens module.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module, comprising:
   a lens barrel with an accommodation space;
   a lens group accommodated in the accommodation space;
   a filter, a bracket and a sensor set by an image side of the lens group and outside the accommodation space;
      wherein
   the bracket comprises a top wall forming an optical aperture and a side wall extending from the top wall to the image side, the top wall comprises a first surface facing towards an object side, a second surface arranged opposite to the first surface and a third surface connecting the first surface to the second surface and enclosing the optical aperture, the bracket further comprises a first hollow cavity arranged near the third surface, and the first hollow cavity is filled with a black light absorption substance.

2. The lens module as described in claim 1 wherein the bracket further comprises a second hollow cavity arranged near the second surface, and the second hollow cavity communicates with the first hollow cavity, and both the first hollow cavity and the second hollow cavity are filled with black light absorption substance.

3. The lens module as described in claim 2 wherein the bracket further comprises a third hollow cavity arranged near an inner surface of the side wall, and the third hollow cavity, the second hollow cavity and the first hollow cavity communicate with each other, the first hollow cavity, the second hollow cavity and the third hollow cavity are filled with black light absorption substance.

4. The lens module as described in claim 3 wherein the bracket further comprises a fourth hollow cavity arranged near the first surface, the fourth hollow cavity, the third hollow cavity, the second hollow cavity and the first hollow cavity communicate with each other, the first hollow cavity, the second hollow cavity, the third hollow cavity and the fourth hollow cavity are filled with black light absorption substance.

5. The lens module as described in claim 1 wherein the black light absorption substance is a graphene.

6. The lens module as described in claim 1 wherein the third surface is an inclined surface.

7. The lens module as described in claim 1 wherein the filter is arranged between the lens barrel and the bracket, and is supported on the first surface.

8. The lens module as described in claim 1 wherein the sensor is arranged in the bracket.

\* \* \* \* \*